ELECTRONIC CLIPPING CIRCUIT

Filed Sept. 11, 1957 3 Sheets-Sheet 1

INVENTOR.
NORMAN NESENOFF
BY Victor D. Borst
ATTORNEY

July 19, 1960 N. NESENOFF 2,946,011

ELECTRONIC CLIPPING CIRCUIT

Filed Sept. 11, 1957 3 Sheets-Sheet 3

INVENTOR.
NORMAN NESENOFF
BY Victor D. Borst
ATTORNEY

United States Patent Office 2,946,011

Patented July 19, 1960

2,946,011

ELECTRONIC CLIPPING CIRCUIT

Norman Nesenoff, Flushing, N.Y., assignor to The Sperry Rand Corporation, Ford Instrument Company Division, Long Island City, N.Y., a corporation of Delaware Filed Sept. 11, 1957, Ser. No. 683,919

1 Claim. (Cl. 328—135)

This invention relates to electronic clipping circuits and has for its principal object that of providing a new and novel clipping circuit for deriving rectangular pulses which have time intervals corresponding to discrete portions of a continuously variable voltage input, the time intervals commencing at a given clipping level, which is selectively a maximum or minimum point in the voltage function, and ending when the voltage function next reaches the same clipping level. A new clipping level is established each time the function exceeds the previous level and then reverses direction, if the previous level was a maximum point, or falls below the previous level and reverses direction, if the previous level was a minimum point. The clipping circuit, therefore, operates unidirectionally so that a new clipping level is established only at a maximum or minimum level which is positively or negatively greater than the previously established clipping level. The direction of operation of the device determines whether maximum or minimum points are employed to establish clipping levels.

Conventional clipping circuits normally provide rectangular or truncated pulses whenever a voltage variation exceeds or falls below a previously established constant potential level. The width or duration of such rectangular pulses may be employed to measure the time intervals during which discrete portions of a continuously variable function either exceeds or falls below an established constant reference level.

As contemplated the circuit is arranged according to whether the maximum or minimum points in the input function are to be employed as clipping levels. For increasing levels of continuous voltage variations, the clipping level is automatically adjusted to a first level where the slope of the voltage function changes from positive to negative. The first clipping level can be adjusted only to another higher level and such adjustment must occur when the voltage function exceeds the previously established clipping level. A second clipping level is established when the value of function exceeds the previous level and the slope of the voltage function becomes negative again. The operations repeat for the entire duration of the voltage function and the final clipping level represents the highest value reached by the variable function during the entire time interval.

Accordingly, in a principal embodiment of this invention, there is provided an input circuit having a condenser in series connection with a vacuum tube diode, the input circuit having a continuous variable voltage function impressed thereon. A vacuum tube amplifying circuit is connected at its input side across the diode. The amplifying circuit may control a bi-stable multivibrator for providing variable width rectangular pulses of uniform amplitude. When the variable voltage impressed upon the input circuit has a plurality of intermediate positive levels which progressively increase during the overall time interval, the diode is oriented for low impedance conduction in the direction from the control grid to the cathode of the vacuum tube amplifying circuit. The condenser charging current supplied by the increasing values of input voltage is conducted through the diode while the potential of the grid in the amplifying circuit is obliged to remain at zero potential by the low impedance shunting diode. As the input voltage increases, the charge on the condenser plates and the voltage across the condenser varies in direct proportion with the applied voltage. At a point in the variable voltage function where the voltage starts to decrease, the orientation of the diode prevents the condenser charging current from reversing and hence the potential of the grid becomes negative in direct proportion to the voltage difference from the maximum level established by the condenser. The potential of the grid will remain negative until the impressed voltage on the input circuit exceeds the previous high level and thereafter the grid will remain at zero potential as long as the input voltage does not start to drop again. The negative potential variations of the grid are amplified by the triode circuitry to yield a pulse to its output circuit having a width corresponding to the time duration when the voltage function was below its previous high level. When desired, the pulses so generated can be made rectangular in form with uniform amplitudes by driving a bi-stable multivibrator with the output pulses of the amplifying circuit.

For cases in which the variable voltage function is a negative variation, the orientation of the diode is reversed and a D.-C. voltage is provided to quiescently bias the triode amplifier at a cutoff value. When the impressed voltage upon the input circuit decreases, the condenser charging current is conducted through the diode for maintaining the grid at zero potential. However, if the impressed voltage function starts to increase, the potential of the grid becomes and remains positive until the function falls below the previously established low level.

In embodiments where it is desirable to prevent a change in the clipping levels until a preselected voltage tolerance is traversed, a bias voltage is inserted in the grid or cathode circuit of the amplifying triode for establishing a discrete threshold.

These and other features, capabilities and advantages of the invention will appear from the subjoined detailed description of embodiments thereof illustrated in the accompanying drawings in which.

Figures 1, 2, 3, 4, 9:
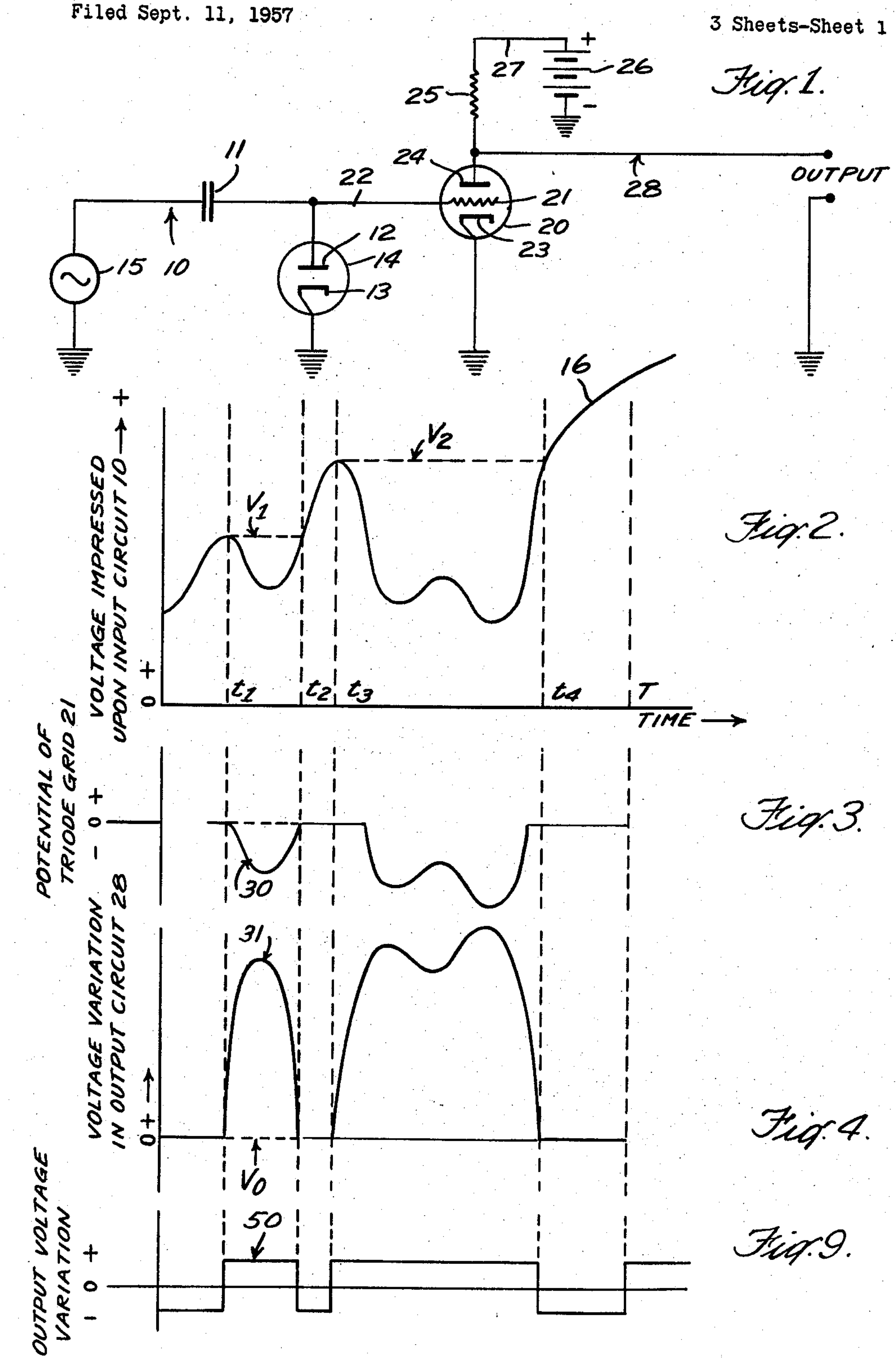
Fig. 1 is a schematic diagram of a clipping circuit incorporating variable clipping levels for a positive voltage function.
Fig. 2 is a diagram of a positive voltage function as impressed upon the input circuit of Fig. 1.
Fig. 3 is a diagram illustrating the time-potential variations of the triode grid in Fig. 1.
Fig. 4 is a diagram illustrating the voltage pulse generated in the output circuit of Fig. 1.
Fig. 9 is a diagram illustrating the rectangular pulses generated in the output circuit of Fig. 8.

Referring to Fig. 1, an input circuit 10 comprises in series connection a condenser 11 and a unidirectional device, such as a vacuum tube diode 14 having a plate 12 and a cathode 13, the input circuit being connected across a signal source 15 having a grounded terminal. For the case in which the ungrounded terminal of signal source 15 has a variably positive voltage function over the time interval zero to T as shown in Fig. 2 by the curve 16, diode 14 is oriented so that its cathode is connected to ground. A vacuum tube triode 20 is connected at its input side across diode 14, a grid 21 of triode 20 being connected to the plate 12 of diode 14 by a conductor 22 and the cathode 23 of triode 20 being grounded. The plate 24 of triode 20 is connected through a resistor 25 to the positive terminal of D.C. source 26 by a conductor 27, the negative terminal of source 26 being grounded. An output circuit 28 is coupled across the plate 24 and cathode 23 of triode 20.

For the time interval zero to T, when the voltage of source 15 is increasing, the condenser 11 is charged through the diode 14. During this interval, the low impedance shunting of the grid 21 and cathode 23 of triode 20 by diode 14 maintains the potential of grid 21 at zero potential as shown in Fig. 3 by curve 30. At time instant $t_1$, the voltage of source 15 starts to decrease and the condenser 11 can not reverse its charging current due to the very high reverse impedances of diode 14 and the input circuit of triode 20. Hence, the potential of grid 21 becomes and is maintained negative during time interval $t_1$ to $t_2$ as shown by curve 30 until the voltage of source 15 reaches the voltage plateau $V_1$ estabilshed at time instant $t_1$. During the time interval $t_2$ to $t_3$ when the voltage of source 15 is increasing above the voltage level $V_1$, condenser 11 resumes its charging through diode 14 and the voltage of grid 21 is clamped to zero potential. At time instant $t_3$, the voltage of source 15 starts to decrease from level $V_2$ and continues to vary until time instant $t_4$ when the voltage function exceeds level $V_2$. For the time interval $t_3$ to $t_4$, the potential of grid 21 decreases from zero and varies with a negative voltage with respect to ground potential until it becomes zero again at time instant $t_4$. During the balance of the overall time interval T, the voltage of source 15 continues to increase and the low impedance shunting effected by diode 14 maintains a zero potential on grid 21.

In Fig. 4, curve 31 diagrammatically represents the voltage variations in the output circuit 28 When the potential of grid 21 is zero, the voltage across the output circuit 28 has a quiescent value $V_0$. However, when the potential of grid 21 is negative during time intervals $t_1$ to $t_2$ and $t_3$ to $t_4$, pulses are generated in the output circuit 28, the pulses having durations $t_1$ to $t_2$ and $t_3$ to $t_4$, respectively.

From the foregoing, it will be seen that pulses will be generated in the output circuit 28, the width of the generated pulses corresponding to the time intervals when the varying voltage function is lower than the established high voltage level in a previous time interval. The output pulse will be the grid voltage amplified and inverted and for which negative grid voltages the amplifier may be cut off so that the output will be limited and will appear as a modified rectangular wave form.

For simplifying the understanding of other embodiments of the invention, like reference numbers will be used to identify corresponding elements in Figures 5, 6, 7, 8, and 10.

Figure 5:
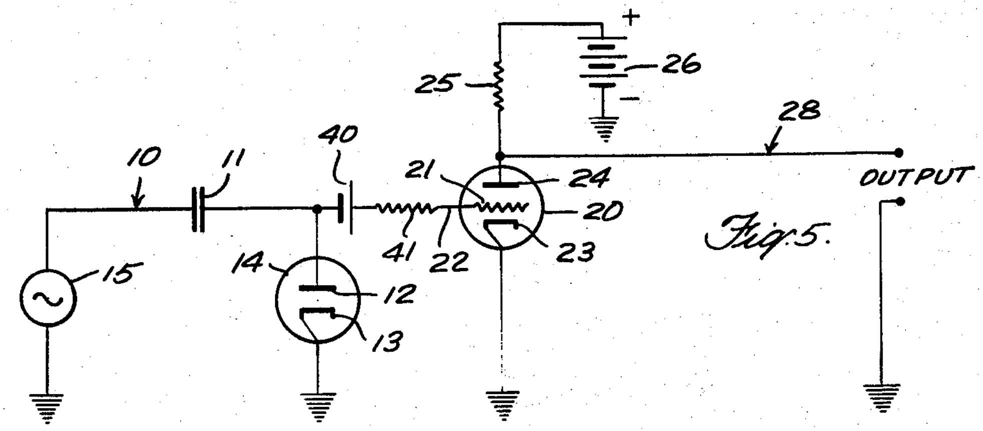
Fig. 5 is a modification of Fig. 1 in which output pulses are not generated for small negative variations of the input variable voltage function.

In order to prevent triggering of pulses for slight variations in the voltage function, the embodiment of the invention in Fig. 5 has a D.C. source 40 inserted in the connection 22 between the grid 21 of triode 20 and the plate 12 of diode 14, the negative side of source 40 being connected to the plate 12. The source 40 biases the grid to cathode circuit of triode 20 beyond cut-off so that output circuit 28 will not generate pulses until the magnitude of the variation of the voltage function from a previously established reference voltage exceeds the voltage of source 40. A resistor 41 may be serially connected with the source 40 for limiting the flow of grid current.

Figure 6:
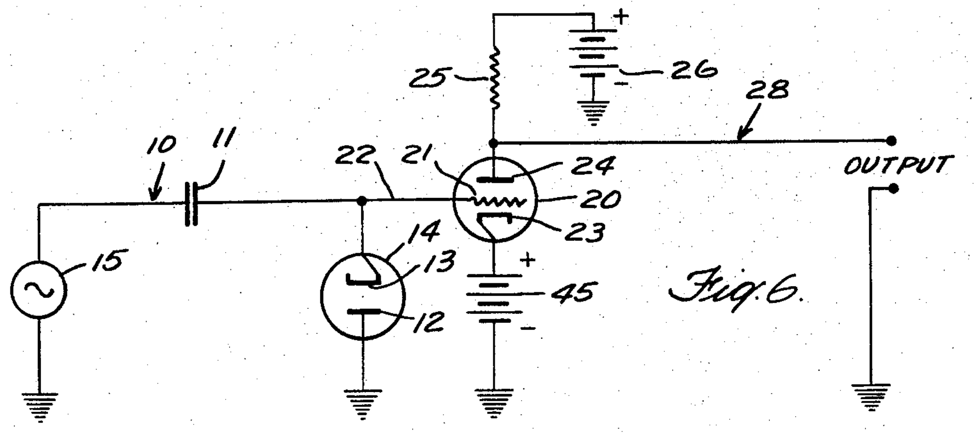
Fig. 6 is a modification of Fig. 1 for accommodating a negative variable voltage variation.

In Fig. 6 is shown a modification of Fig. 1 in which the voltage function impressed upon the input circuit 10 from the ungrounded side of signal source 15 is a variation of negative voltages. For this embodiment of the invention, the orientation of the diode 14 is reversed so that its cathode 13 is connected to the grid 21 of triode 20. Additionally, a D.C. source 45 is provided in the connection of the cathode 23 of triode 20 to ground for biasing the triode substantially at cut-off. When the voltage function increases in the negative direction, the condenser 11 charges through diode 14 and the voltage of triode grid 21 is maintained at zero potential. At a voltage plateau when the voltage function reverses, the potential of triode grid 21 varies in a positive manner for generating pulses in the output circuit 28. The generated pulses in the output circuit 28 are similar, but of opposite phase, to those represented by curve 31 in Fig. 4 when the impressed voltage on input circuit 10 is similar, but of opposite polarity, to that represented by curve 16 in Fig. 2.

Figure 7:
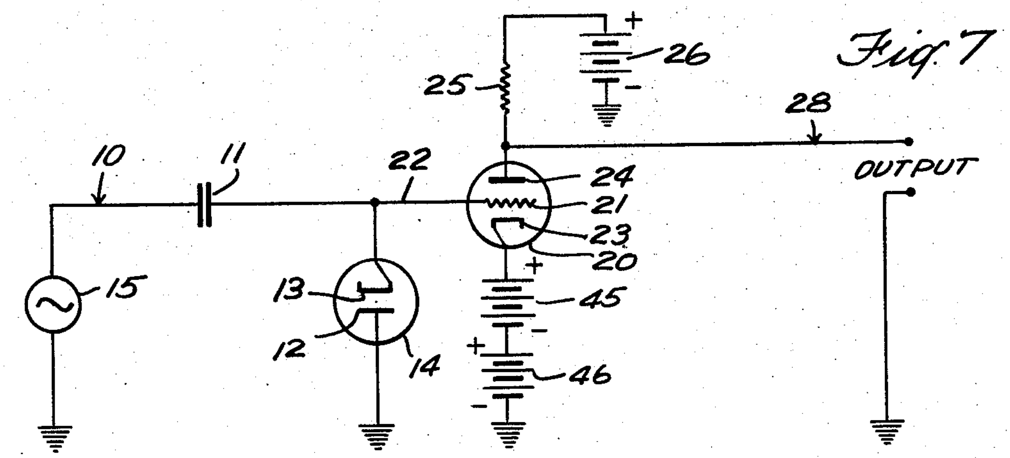
Fig. 7 is a modification of Fig. 6 in which output pulses are not generated for small positive variations of the input variable function.

The modification of Fig. 6 as schematically represented in Fig. 7 prevents the generation of pulses in the output circuit 28 unless the reverse variation of the negative voltage function from a previously established level exceeds the voltage of a source 46, the source 46 being serially connected with the bias source 45.

Figure 8:
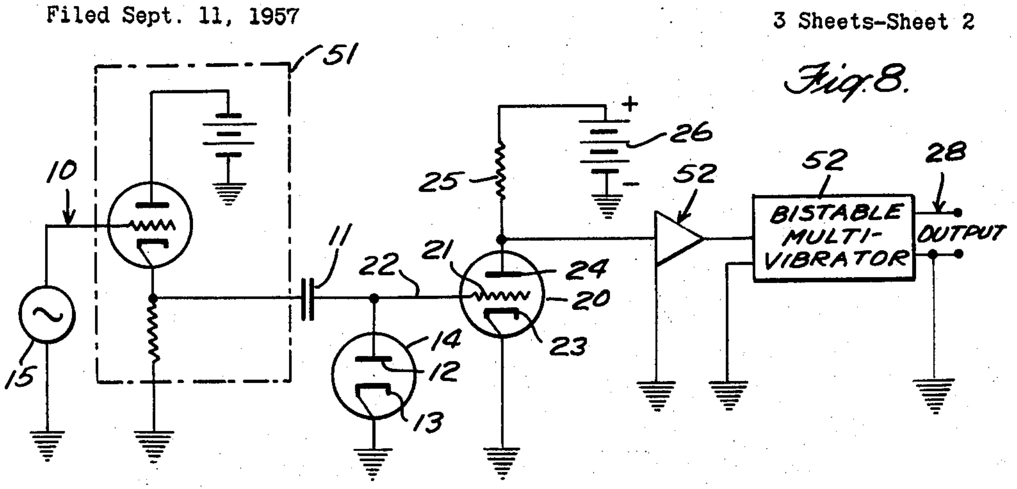
Fig. 8 is a modification of Fig. 1 for deriving rectangular pulses of uniform amplitude from a high impedance signal source.

Fig. 8 is a modification of Fig. 1 for providing rectangular pulses having uniform amplitude such as represented by curve 50 in Fig. 9 when the input voltage function is as represented by curve 16 in Fig. 2. Additionally, conventional cathode follower circuitry 51 is provided between the signal source 15 and condenser 11 in input circuit 10 in order to cope with an assumed practical condition occasioned by the source 15 having a high internal impedance. The conversion of the wave form of curve 31 in Fig. 4 to that of curve 50 in Fig. 9 is accomplished by connecting a bi-stable multivibrator 52 between the tube 20 and the output circuit 28, the multivibrator being coupled, at its input side, through an amplifier **52*a* to the plate 24 and cathode 23 of triode 20**.

Figure 10:
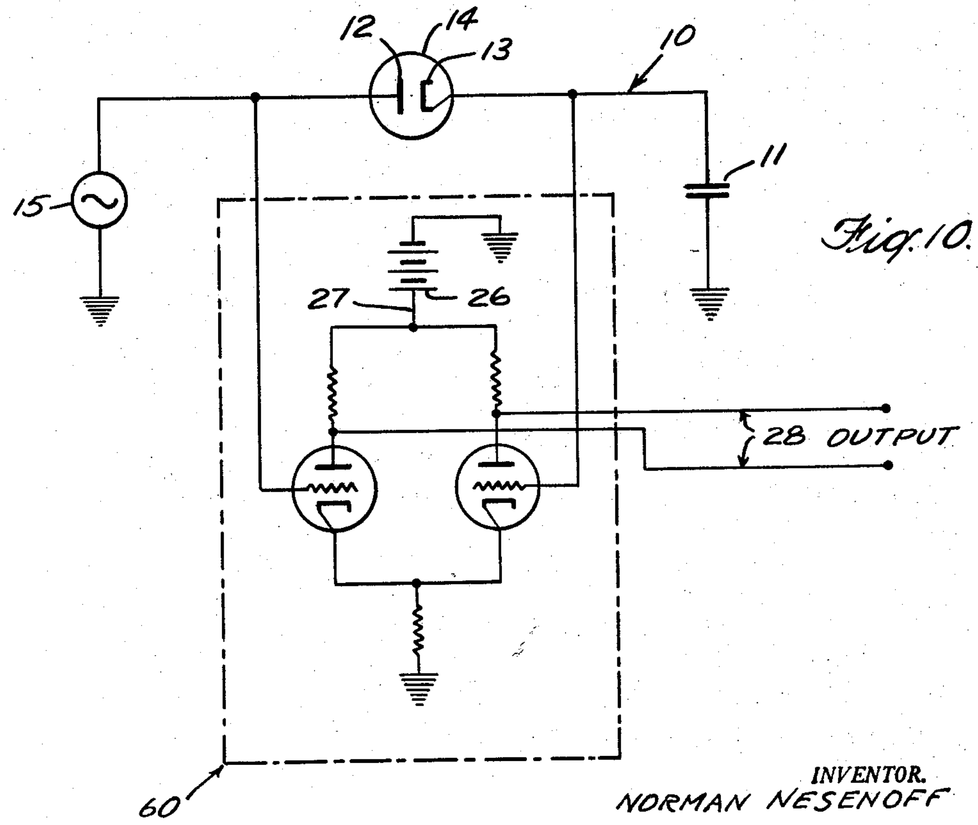
Fig. 10 is a modification of Fig. 1 in which a difference amplifier is employed.

In Fig. 10 is shown a modification of Fig. 1 in which a difference amplifier 60 is connected across the diode 14 in the series input circuit 10 for generating pulses in output circuit 28, both sides of the input and output circuits of the difference amplifier being isolated from ground potential.

It is to be understood that various modifications of the invention other than those above described may be effected by persons skilled in the art without departing from the principle and scope of the invention as defined in the appended claim.

What is claimed is:

A clipping circuit system for generating pulses of a time duration which commences at different voltage or clipping levels in a variable voltage function, said system comprising an input circuit adapted to have a continuously variable voltage function impressed thereon, a unidirectional vacuum tube diode and a condenser interposed in series in said input circuit, a pair of vacuum tube triodes, the grid of one of said triode tubes being connected to the plate of said diode tube and the grid of the other triode tube being connected to the cathode of said diode tube, a conductor having a resistor therein by which the plate of one of said triode tubes is connected to a D.C. source, another conductor having a resistor therein by which the plate of the other of said triode tubes is connected to said D.C. source, conductor means by which the cathodes of said triode tubes are grounded through a resistor, and an output circuit which comprises a pair of leads one of which is connected to the plate of one of said triode tubes and the other of which is connected to the plate of the other of said triode tubes.

References Cited in the file of this patent

UNITED STATES PATENTS

| | | |
|---|---|---|
| 2,519,057 | Luck | Aug. 15, 1950 |
| 2,525,106 | Wendt | Oct. 10, 1950 |
| 2,543,037 | Mayle | Feb. 27, 1951 |
| 2,822,470 | Imm | Feb. 4, 1958 |
| 2,823,275 | Ault | Feb. 11, 1958 |